United States Patent [19]

Haberer

[11] 4,075,545
[45] Feb. 21, 1978

[54] CHARGING SYSTEM FOR AUTOMOBILE BATTERIES

[76] Inventor: Merle D. Haberer, Bowdle, S. Dak. 57428

[21] Appl. No.: 747,512

[22] Filed: Dec. 6, 1976

[51] Int. Cl.² .................... B60L 11/18; F03D 9/02
[52] U.S. Cl. ................................. 320/61; 180/65 R; 290/44; 290/55
[58] Field of Search .................. 320/2, 61; 322/1, 35; 290/44, 55; 180/65; 310/115–125; 416/198–200

[56] References Cited

U.S. PATENT DOCUMENTS

| | | | |
|---|---|---|---|
| 436,595 | 9/1890 | Collins | 416/119 |
| 2,153,523 | 4/1939 | Roberts et al. | 290/55 |
| 2,941,613 | 6/1960 | DiPerna | 180/65 |
| 3,374,849 | 3/1968 | Redman | 180/65 |
| 3,444,946 | 5/1969 | Waterbury | 180/65 |
| 3,513,326 | 5/1970 | Potts | 290/55 |
| 3,556,239 | 1/1971 | Spahn | 180/65 |
| 3,697,765 | 10/1972 | Carini | 290/54 |
| 3,713,503 | 1/1973 | Haan | 180/65 |
| 3,878,913 | 4/1975 | Lionts et al. | 180/65 |
| 4,002,218 | 1/1977 | Horvat | 290/44 X |

Primary Examiner—Robert J. Hickey
Attorney, Agent, or Firm—Merchant, Gould, Smith, Edell, Welter & Schmidt

[57] ABSTRACT

A pair of air driven impeller rotors mounted in the front end portion of a vehicle and operatively connected to one or more generators for charging drive motor energizing batteries responsive to forward movement of the vehicle. The impeller rotors are disposed in radially spaced parallel relationship to provide an air passageway therebetween, each rotor including a cylindrical drum and vanes projecting outwardly from the drum. The impeller rotors operate to rotate the generator field or pole pieces in one direction and the generator armature or armatures in the opposite direction. Guide structure includes a pair of cross-sectionally arcuate guide portions which cooperate with the impeller to define discharge passageways extending generally circumferentially of the impeller rotors.

6 Claims, 8 Drawing Figures

CHARGING SYSTEM FOR AUTOMOBILE BATTERIES

BACKGROUND OF THE INVENTION

Wind driven generator operating apparatus is known in both stationary and moving installations. More specifically, wind driven generators have been used to charge batteries for electrical motor-driven vehicles. In some relatively stationary apparatus, means has been provided for rotating the field or pole pieces of a generator in an opposite direction from that of rotation of the armature to achieve a high differential of speed between the field and armature.

SUMMARY OF THE INVENTION

In this invention, a vehicle having, a body, supporting wheels for said body, motor means for driving at least one of said wheels, an electrical storage battery, and generator means for charging said battery and including field pole pieces and an armature, generator operating means is provided for imparting relative rotation between said armature and pole pieces, the generator operating means comprising; a pair of impeller rotors each including a cylindrical drum and circumferentially spaced vanes projecting generally radially outwardly from said drum and extending generally longitudinally of said drum, and means journaling said impeller rotors in said body on parallel axes and in closely spaced apart relationship to define an air passageway between said impeller rotors; one of said impeller rotors being operatively connected to said field pole pieces for rotation therewith, and armature driving means operatively connecting the other of said impeller rotors to said armature for rotation therewith. Conduit means defines an air inlet for movement of air from the exterior of said body to said air passageway for imparting rotation to each of said impeller rotors in a direction opposite that of the other of said impeller rotors responsive to forward movement of the vehicle, whereby to rotate said field pole pieces and armature in opposite directions relative to each other, and guide means in said body cooperates with said impeller rotors to provide discharge passageways leading from said air passageway generally circumferentially of said impeller rotors.

DETAILED DESCRIPTION OF THE PREFERRED EMBODIMENTS

In the embodiment of the invention illustrated in FIGS. 1-6, an automotive vehicle is fragmentarily shown as including a body 11, supported at its front end portion by pneumatic tire equipped wheels 12, and at its rear end portion by other wheels, not shown. The body 11 is further shown as including a windshield 13 and head lamps 14.

Figure 1:
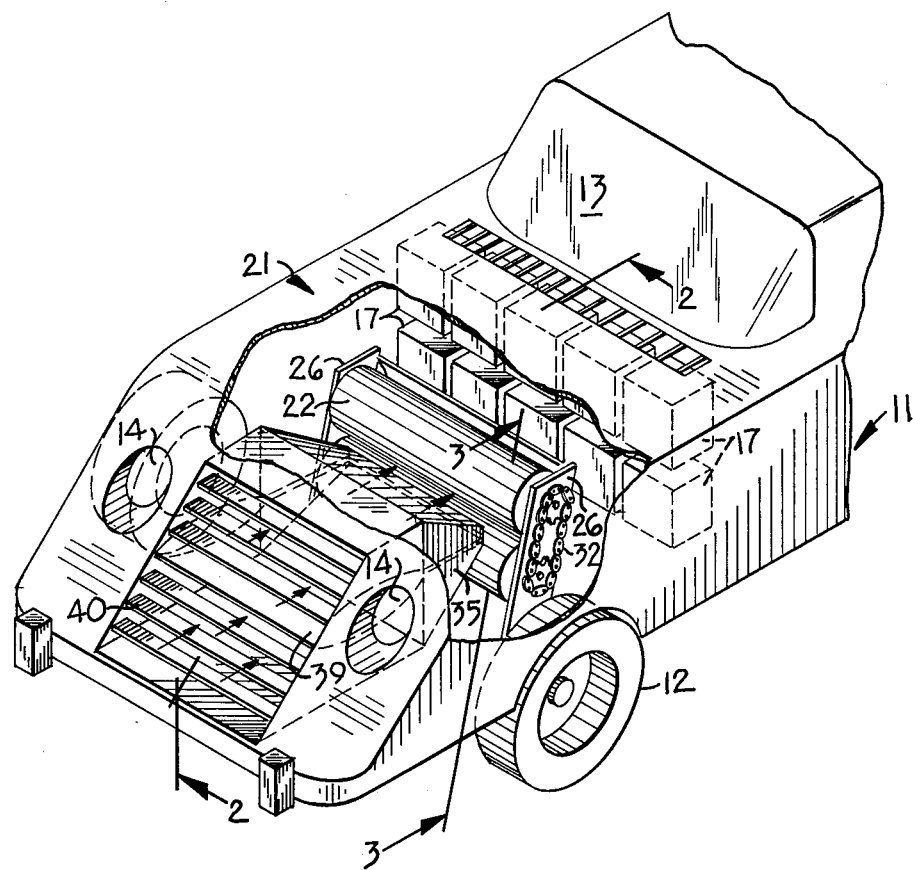
FIG. 1 is a fragmentary view in perspective of a vehicle including the battery charging system of this invention some parts being broken away.
Figure 2:
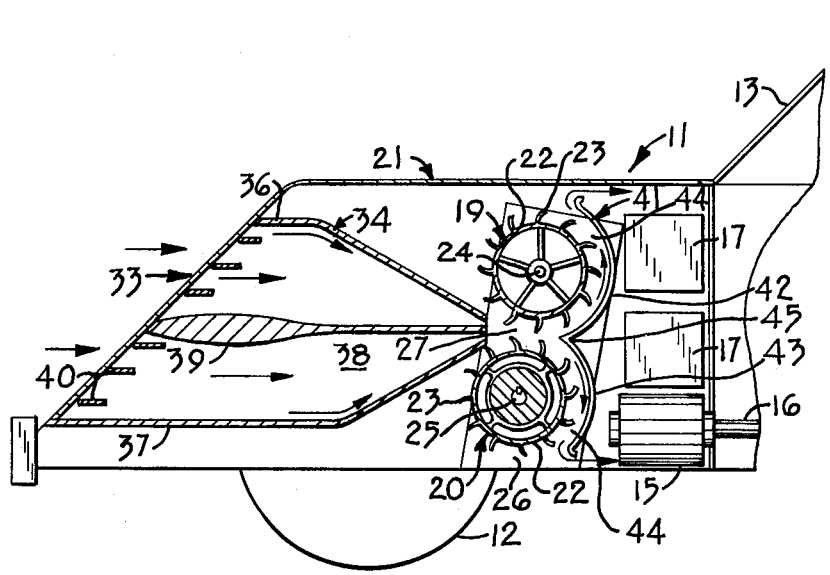
FIG. 2 is a fragmentary section taken generally on the line 2—2 of FIG. 1.
Figure 4:
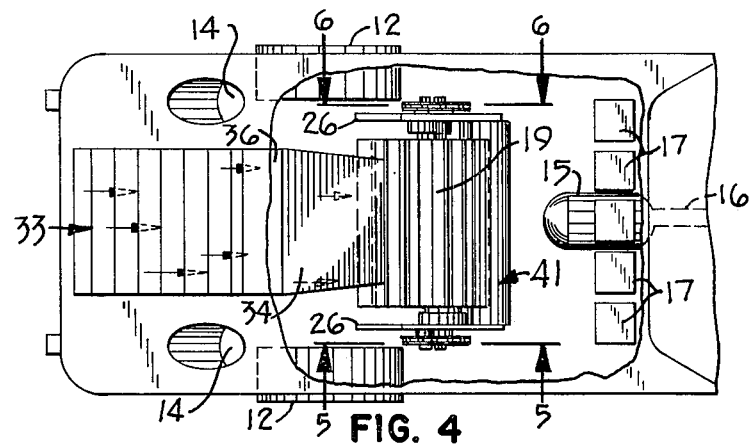
FIG. 4 is a fragmentary view in top plan, some parts being broken away.

The vehicle illustrated is adapted to be driven by an electric motor 15, shown diagrammatically in FIGS. 2 and 4, and provided with a drive shaft 16 that is adapted to be operatively connected to the rear wheels, not shown. but in the well-known manner. The motor 15 is adapted to be energized by a series of electric batteries 17, shown diagrammatically in FIGS. 1, 2 and 4, and operatively connected to the motor 15 by suitable control elements, not shown.

Figure 3:
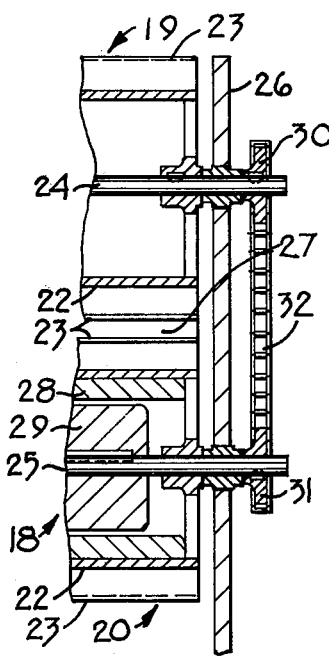
FIG. 3 is an enlarged fragmentary section taken on the line 3—3 of FIG. 1.

Means for charging the batteries 17 comprises an electric generator 18 contained within one of a pair of impeller rotors 19 and 20 that are mounted within the hood portion 21 of the body 11. The generator 18 is shown as being mounted in the impeller rotor 20. Each impeller rotor 19 and 20 comprises an elongated cylindrical drum 22 and a plurality of longitudinally extending vanes 23 that project generally radially outwardly from their respective drums 22. Each drum 22 is mounted on a respective one of a pair of parallel shafts 24 and 25 that are journaled at their opposite end portions in suitable bearings in plate-like support members 26 mounted in the vehicle body 11. As shown in FIG. 3, the drum 22 of the impeller rotor 19 is keyed to its respective shaft 24 for rotation therewith, the drum 22 of the impeller rotor 20 being journaled on its respective shaft 25. The shafts 24 and 25 are so spaced as to provide a narrow spacing between the impeller rotors 19 and 20, said spacing providing an air passageway 27.

The generator 18 comprises a field including pole pieces 28 and a cooperating armature 29, both of which are shown more or less diagrammatically in FIGS. 2 and 3, the pole pieces 28 being rigidly secured to the interior of the drum 22 of the impeller rotor 20 for rotation therewith, the armature 29 being rigidly mounted on the shaft 25 for rotation therewith. The pole pieces 28 and armature 29 may be assumed to be electrically connected to the batteries by well-known means, such as collector rings and brushes, not shown.

Figure 5:
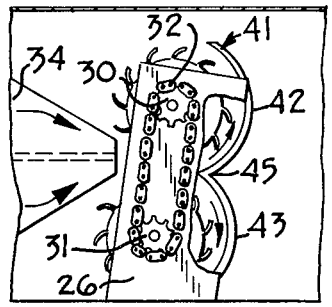
FIGS. 5 and 6 are fragmentary views, partly in side elevation and partly in section, taken generally on the lines 5—5 and 6—6 respectively of FIG. 4.
Figure 6:
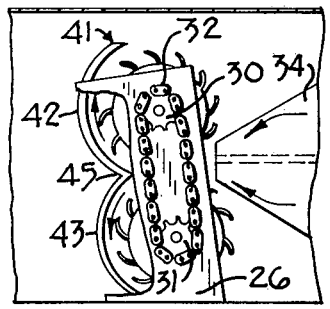

The shaft 24 is operatively coupled to the shaft 25 by means of wheel members, such as sprocket wheels 30 and 31 keyed on the shafts 24 and 25 respectively, and an endless flexible drive member, such as a sprocket chain 32 entrained over the sprocket wheels 30 and 31. The impeller rotor 19 is adapted to rotate in a counterclockwise direction with respect to FIG. 2, the impeller rotor 20 being adapted to rotate in a clockwise direction with respect to FIG. 2. Hence, with the armature 29 of the generator 18 rotating in a counterclockwise direction, and the pole pieces 28 rotating in a clockwise direction, the differential in rotary speed therebetween is substantially greater than it would be if the pole pieces 28 were stationary and only the armature 29 rotated. In FIGS. 4 and 6, the sprocket wheels 30 and 31 and link chain 32 are shown as being duplicated at the opposite end of the shafts 24 and 25 from that which is shown in FIGS. 2 and 5.

The front end of the vehicle body 11 defines an air inlet opening 33 from which a conduit 34 extends rearwardly toward the air passageway 27. The conduit 34 has opposite side walls 35 and top and bottom walls 36 and 37 respectively. The rear end portions of the walls 36 and 37 converge rearwardly and cooperate with the side walls 35 to define an air inlet 38 for guiding air from the inlet opening 33 to the air passageway 27. A generally central partition 39 extends across the conduit 34 and divides the air inlet 38 into upper and lower inlet portions each directing air to the vanes 23 of respective ones of the impeller rotors 19 and 20. Thus, when the vehicle is driven forwardly, air entering the inlet opening 33 is caused to impinge on the vanes 23 of the impeller rotors, whereby to rotate the rotor 19 in a counter-clockwise direction with respect to FIG. 2 and the impeller rotor 20 in a clockwise direction with respect to FIG. 2. At the inlet opening 33, the conduit 34 is provided with a grillwork formed by vertically spaced strips 40 of suitable material, for decorative purposes as well as for the purpose of preventing entry of pieces of foreign material.

For the purpose of enhancing the action of incoming air on the inpeller rotors 19 and 20, I provide a guide member 41 that is elongated in a direction longitudinally of the rotors 19 and 20, and which is secured at its opposite ends to the support members 26 rearwardly of the impeller rotors 19 and 20. The guide member 41 is formed to provide a pair of cross-sectionally arcuate portions 42 and 43 each describing an arc generally concentric with a respect one of the impeller rotors 19 and 20, and each cooperating with its respective rotor to define a discharge passageway 44 leading from the air passageway 27 in directions circumferentially of the impeller rotors 19 and 20. The arcuate portions 42 and 43 of the guide member 41 cooperate to form a dividing edge 45 that is disposed in a plane extending longitudinally of the air passageway 27 and centrally between the impeller rotors 19 and 20, so as to direct incoming air into the discharge passages 44. By guiding the incoming air circumferentially of the impeller rotors, for a portion of the circumference thereof, I have found that efficiency of operation of the impeller rotors 19 and 20 is achieved. Further, by connecting the pole pieces 28 to one of the impeller rotors, and driving the armature 29 from the other impeller rotor in the opposite direction, the generator can operate to provide an efficient charging rate to the batteries 17 even when the vehicle is moving at relative low speeds such as are necessary in city driving.

Figure 7:
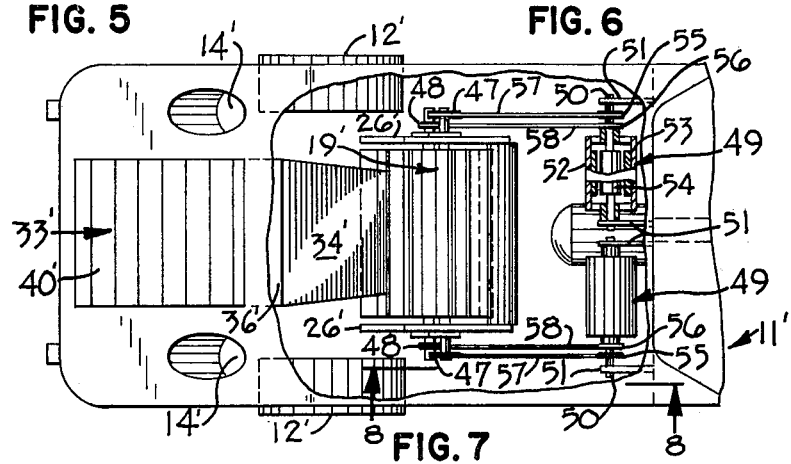
FIG. 7 is a view corresponding generally to FIG. 4 but showing a modified arrangement.
Figure 8:
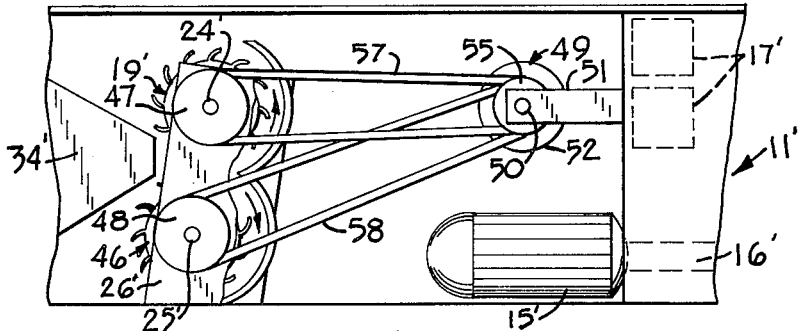
FIG. 8 is an enlarged fragmentary view, partly in plan and partly in section, taken substantially on the line 8—8 of FIG. 7.

In the modified arrangement illustrated in FIGS. 7 and 8, parts identical to corresponding parts shown in FIGS. 1–6 are indicated by like reference numerals with prime marks added. In FIGS. 7 and 8, a pair of impeller rotors 19' and 46 are mounted on shafts 24' and 25' respectively, these being journaled in support members 26'. The impeller rotor 46 differ from the rotor 20 in that it is substantially identical to the rotors 19 and 19'. The rotors 19' and 46 are preferably keyed or otherwise rigidly secured to their respective shafts 24' and 25', these shafts having mounted fast on their opposite ends wheel members 47 and 48. In the embodiment of the invention illustrated in FIGS. 7 and 8, the wheel members 47 and 48 are in the nature of pulleys. A pair of generators 49 have drive shafts 50 that are journaled in mounting brackets 51 secured to the vehicle body 11. Each generator 49 includes a housing 52 that is journaled on its respective shaft 50, each housing 52 having field or pole pieces 53 secured thereto for rotation therewith. Further, each generator 49 includes an armature 54 that is mounted fast on its respective shaft 50 for rotation therewith. Wheel members, such as pulleys 55 and 56, are mounted fast on the shafts 50 and housings 52 respectively and are driven by endless flexible belts 57 and 58 that are entrained thereover and over respective ones of the pulleys 47 and 48 to rotate the pole pieces 53 and armatures 54 in directions opposite to each other responsive to rotation of the impeller rotors 19' and 46'.

If desired, the impeller rotor 19 may, like the impeller 20, be provided with a second generator, not shown, in which the pole pieces might be secured to the drum 22 of the rotor 19 and an armature journaled on the shaft 24. In such an arrangement, the drive chain 32 at one end of the shafts 24 and 25 would run over a sprocket wheel attached to the drum of the impeller rotor 20 and over a second sprocket wheel attached to the armature in the impeller rotor 19, for rotation therewith. Thus, both rotors 19 and 20 would include generators having their pole pieces and armatures rotating in opposite directions relative to each other.

While I have shown and described several embodiments which the battery system of this invention may include, it will be understood that the same is capable of further modification without departure from the spirit and scope of the invention, as defined in the claims.

What is claimed is:

1. In a vehicle having a body, supporting wheels for said body, motor means for driving at least one of said wheels, an electrical storage battery, and generator means for charging said battery and including field pole pieces and an armature; generator operating means for imparting relative rotation between said armature and pole pieces and comprising:
   (a) a pair of impeller rotors each including a cylindrical drum and circumferentially spaced vanes projecting generally radially outwardly from said drum and extending generally longitudinally of said drum;
   (b) means journaling said impeller rotors in said body on parallel axes and in closely spaced apart relationship to define an air passageway between said impellers rotors;
   (c) one of said impeller rotors being operatively connected to said field pole pieces for rotation therewith;
   (d) armature driving means operatively connecting the other of said impeller rotors to said armature for rotation therewith;
   (e) conduit means defining an air inlet for movement of air from the exterior of said body to said air passageway for imparting rotation to each of said impeller rotors in a direction opposite that of the other of said impeller rotors responsive to forward movement of the vehicle, whereby to rotate said field pole pieces and armature in opposite directions relative to each other.
   (f) and guide means in said body cooperating with said impeller rotors to provide discharge passageways leading from said air passageway generally circumferentially of said impeller rotors.

2. The generator operating means defined in claim 1 in which said guide means comprises a guide member elongated in a direction longitudinally of said impeller rotors and formed to provide a pair of cross sectionally arcuate portions each describing an arc generally concentric with a different one of said impeller rotors.

3. The generator operating means defined in claim 2 in which said arcuate portions cooperate to form a dividing edge disposed in a plane extending longitudinally of said air passageway and centrally between said impeller rotors.

4. The generator operating means defined in claim 1 in which said pole pieces are mounted within the drum of one of said rotors for rotation therewith, said armature being journaled within the drum of said one of the rotors coaxial therewith, said armature driving means comprising a pair of wheel members one of which is operatively connected to the other of said rotors and the other of which is operatively connected to said armature, and an endless flexible drive member entrained over said wheel members.

5. The generator operating means defined in claim 1 in which said generator means comprises a pair of generators mounted in said body in spaced relation to said rotors and each incuding pole pieces and an armature, said armature driving means comprising pairs of wheel members operatively connected to said armatures and said other one of said impeller rotors, and endless flexible drive members entrained over the wheel member of said impeller rotors and respective wheel members of said armature, said last mentioned pole pieces being operatively connected to said one of the impeller rotors by the cooperating pairs of wheel members connected to said one of the impeller rotors and the pole pieces on respective ones of said generators, and endless flexible drive members entrained over the wheel motors of said cooperating pairs thereof.

6. The generator operating means defined in claim 1 in which said conduit means includes a pair of outer walls converging towards said air passageway and a partition generally centrally between said outer walls and dividing said air inlet into a pair of like inlet portions each directed primarily toward the vanes of a respective one of said impeller rotors.

* * * * *

UNITED STATES PATENT AND TRADEMARK OFFICE
CERTIFICATE OF CORRECTION

PATENT NO. : 4,075,545
DATED : February 21, 1978
INVENTOR(S) : Merle D. Haberer

It is certified that error appears in the above-identified patent and that said Letters Patent are hereby corrected as shown below:

Column 1, line 53: "invention" should be --invention,--;

Column 3, line 29: "respect" should be --respective--;

Column 3, line 47: "relative" should be --relatively--;

Column 6, line 5: "armature" should be --armatures--; and

Column 6, line 7: "the" should be omitted.

Signed and Sealed this

Twenty-third Day of May 1978

[SEAL]

Attest:

RUTH C. MASON
Attesting Officer

LUTRELLE F. PARKER
Acting Commissioner of Patents and Trademarks